United States Patent Office 3,741,959
Patented June 26, 1973

---

3,741,959
ACYLATION OF 7-AMINOCEPHALOSPORIN OR 6-AMINOPENICILLIN
Brian Edgar Looker, Greenford, John Attenburrow, Uxbridge, and Edward McKenzie Wilson, Westmoreland, England, assignors to Glaxo Laboratories Limited, Greenford, Middlesex, England
No Drawing. Filed Dec. 17, 1970, Ser. No. 99,328
Claims priority, application Great Britain, Dec. 23, 1969, 62,711/69
Int. Cl. C07d *99/16, 99/24*
U.S. Cl. 260—239.1  21 Claims

ABSTRACT OF THE DISCLOSURE

A process for acylating a cephalosporin or penicillin nucleus comprises reacting the 7- or 6-amino group with an acyl chloride or bromide in the presence of an oxirane, e.g. ethylene oxide, a propylene oxide which binds hydrogen halide liberated in the reaction.

---

This invention is cornered with improvements in or relating to the acylation of penicillin or cephalosporin compounds having an amino group at respectively the 6- and the 7-positions.

The compounds referred to in this specification are generally named with reference to penicillanic acid and cepham (see J. Amer. Chem. Soc. 1962, 84, 3400). The term "cephem" refers to the basic cephem structure with one double bond.

In the manufacture of cephalosporin and penicillin antibiotics it is frequently necessary to acylate the amino group of the corresponding so-called nucleus, e.g. 7-amino-cephalosporanic acid or 6-aminopenicillanic acid with an acylating agent, e.g, an acid halide in the presence of a hydrogen halide acceptor. Existing methods of acylation of the aforesaid nuclei with acid halides suffer from one or more of a variety of defects, e.g. impurity of end-product, low yield of end-product, removal of the hydrogen halide acceptor from the reaction mixture, subsequent reactions and side reactions, e.g. formation of $\Delta^2$ cephalosporin isomers. Consequently, there is a need for improved acylation techniques which minimise defects of existing procedures.

The present invention is therefore concerned with an improved process of acylating a cephalosporin or penicillin nucleus with an acyl halide. Essentially our invention may be stated to be the acylation of a cephalsporin or penicillin nucleus with an acyl halide using an oxirane as hydrogen halide acceptor. Such acylations can be effected in good yield and give products of high purity.

According to one aspect of our invention there is provided a process for the preparation of a 7-acylamido-cephem-4-carboxylic acid (or derivative thereof) or a 6-acylamidopenicillanic acid (or derivative thereof) which comprises reacting a 7-aminocephem-4-carboxylic acid or derivative thereof or a 6-aminopenicillanic acid derivative thereof with an acyl halide (i.e. chloride or bromide) in the presence of an oxirane, preferably having a boiling point of 100° C. or less at normal pressure, which binds hydrogen halide liberated in the acylation reaction.

OXIRANE

The oxirane may be a mono- or di-epoxy compound. Generally, mono-epoxy compounds will be used and the oxirane group in such compounds will ordinarily be terminal. Preferably a lower 1,2-alkylene oxide is used. The preferred 1,2-alkylene oxides, by virtue of their low boiling points, low cost and ease of removal of any excess from the reaction vessel after acylation, are ethylene oxide and propylene oxide. Other oxiranes which may be used include cyclohexene oxide, styrene oxide, epichlorohydrin, glycidyl ethers, e.g., phenylglycidyl ether, butadiene diepoxide, etc.

The oxirane may be used in any desired quantities and in any given reaction the quantities chosen may be primarily determined by convenience of operation. Generally the oxirane may be used in quantities at least substantially equivalent to the amount of hydrogen halide generated in the acylation.

While we do not wish to be bound by theoretical considerations it is believed that the oxiranes function as oxygen bases and absorb hydrogen halide by forming a halohydrin. The resulting halohydrin does not appear to have any deleterious effect on the acylation.

REACTION MEDIUM

The acylation will generally be initiated by bringing the reactants into solution or suspension in a reaction medium and then effecting the reaction therein. The oxirane itself may be employed as the reaction medium, particularly in the case of the lower 1,2-alkylene oxides such as propylene oxide. Alternatively, the reaction medium may be an oxirane in admixture with a diluent.

Any diluent employed should preferably be substantially inert to the material used in or produced from the process but may act as a hydrogen halide acceptor. The particular diluent used will depend on the reactants employed and suitable diluents include aprotic materials such as halogenated hydrocarbons, e.g. halogenated alkanes such as dichloromethane, and 1,2-dichloroethane and esters, e.g. ethyl acetate; ketone, e.g. acetone and methyl isobutyl ketone and diluents which contain one of the following groups:

(a) 

(b) 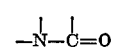

An example of diluent (a) is acetonitrile. Examples of diluents of type (b) are N,N-dimethylacetamide and N,N-dimethylformamide.

CEPHALOSPORIN OR PENICILLIN NUCLEUS

The cephalosporin or penicillin starting compound used may be a compound of the skeletal formula:

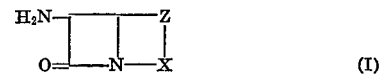

(I)

(where Z is —S—, —SO— ($\alpha$- or $\beta$-) or —SO$_2$— and X is a divalent group selected from

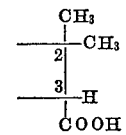

(a)

and

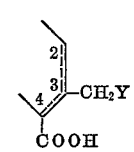

(b)

(wherein Y is hydrogen, acetate, hydroxy or the residue of a nucleophile and the dotted line between the 2-, 3- and 4-positions of (b) indicates that the compound may be a ceph-2-em or ceph-3-em compound) or a derivative, e.g. an ester or a salt thereof.

It will be appreciated that esterification is only a particular method of blocking the carboxy group and that other blocked carboxy group compounds may be made if desired.

It will be appreciated that skeletal Formula I includes within its structure compounds not specifically embraced by groups (a) and (b), e.g. 2β-acetoxymethyl penicillins and 2-methyl and 2-methylene cephalosporins.

When Y is the residue of a nucleophile it may be a halogen atom (i.e. chlorine, bromine or iodine), an ether group, e.g. an alkoxy group preferably a lower alkoxy group, e.g. a methoxy group or a thioether group, e.g. an alkylthio group preferably a lower alkylthio group, e.g. a methylthio group.

Starting compounds of the process according to the invention wherein Y is the residue of a nucleophile may be prepared by the reaction of a cephalosporin compound with a nucleophile, for example, pyridine or other tertiary amine as described in British Pat. No. 912,541; a sulphur-linking, nitrogen-linking or inorganic nucleophile as described in British Pat. No. 1,012,943; a sulphur-linking nucleophile as described in British Pats. Nos. 1,059,562, 1,101,423 and 1,206,305; a nitrogen-linking nucleophile as described in British Pats. Nos. 1,030,630, 1,082,943 and 1,082,962. This list is not limiting and is given purely by way of illustration. Where Y is a hydroxy group the compound may be prepared by the methods described in Bristish Pat. No. 1,121,308.

Where Y is a halogen (i.e. chlorine, bromine or iodine) ceph-3-em starting compounds may be prepared by halogenation of a 7β-acylamido-3-methylceph-3-em - 4 - carboxylic acid ester 1β-oxide followed by subsequently reduction of the 1β-oxide group as described in copending U.S. application No. 66,128, filed Aug. 21, 1970.

The corresponding ceph-2-em compounds may be prepared by the method of Dutch published patent application No. 6902013 by reaction of a ceph-2-em-3-methyl compound with N-bromo-succinimide to yield the ceph-2-em-3-bromomethyl compound.

Where Y is a hydrogen atom the compound may be prepared by the method described in British Pat. No. 957,569 or from a penicillin compound by the method described in U.S. patent specification No. 3,275,626. In the U.S. patent specification there is described a general method for preparing antibiotic substances, including cephalosporins, which comprises heating a so-called penicillin sulphoxide under acid conditions to a temperature of from about 100° C. to about 175° C. By means of this process esters of 6β-acylamidopenicillanic acid 1-oxides can be converted into analogous esters of 7β-acylamido-3-methylceph-3-em - 4 - carboxylic acids. Starting compounds for the process according to the invention may be obtained from the products of this reaction by N-deacylation by methods described in the literature.

The process may conveniently be carried out using esters of the penicillin or cephalospin compound. One may also use the free acid or an acid addition salt of the free acid or ester thereof. Salts which may be used include acid addition salts, e.g. with hydrochloric, hydrobromic, sulphuric, nitric, phosphoric, toluene-p-sulphonic and methane sulphonic acids.

The ester may be formed with an alcohol or phenol having up to 20 carbon atoms which may readily be split off at a later stage of the overall reaction.

Alcohol and phenol residues which may readily be split off include those containing electron-attracting substituents for example sulpho groups and esterified carboxyl groups; these groups may be subsequently split off by alkaline reagents. Benzyl and o-benzyloxyphenoxy ester groups may be removed by hydrogenolysis. A preferred method of removal involves cleavage by acid and groups which may be removed by acid include adamantyl, t-butyl, benzyl residues such as anisyl and the residues of alkanols containing electron donors in the α-position such as acyloxy, alkoxy, benzoyloxy, substituted benzoyloxy, halogen, alkylthio, phenyl, alkoxy-phenyl or aromatic heterocyclic.

These radicals may be derived from benzyl alcohols such as p-methoxybenzyl alcohol, di-p-methoxyphenyl-methanol, triphenylmethanol, diphenylmethanol, benzoyloxymethanol or p-nitrobenzyl alcohol and furfuryl alcohol. We particularly prefer to use compounds having inter alia a diphenylmethylcarbonyl, p-methoxybenzyl or a t-butyl group as the esterifying group.

Alcohol residues which may be readily split off subsequently by reduction are those of a 2,2,2-trihalogenoethanol, e.g. 2,2,2,-trichloroethanol, p-nitrobenzyl alcohol or 4-pyridylmethanol. 2,2,2-trihalogenoethyl groups may conveniently be removed by zinc/acetic acid, zinc/formic acid, zinc/lower alcohol or zinc/pyridine or by chromous reagents; p-nitrobenzyl groups may conveniently be removed by hydrogenolysis.

When the esterifying group is subsequently removed by an acid catalysed reaction, this may be effected by using formic acid or trifluoroacetic acid (e.g. in conjunction with anisole) or alternatively by using hydrochloric acid (e.g. in admixture with acetic acid).

These methods for the removal of ester groups are generally applicable to cephalosporin and penicillin compounds except where a strong acid is employed in which case the method in question will not normally be suitable for use with penicillin compounds.

Other groups which can readily be converted to carboxy groups include silyloxycarbonyl and stannyloxycarbonyl groups.

Although silyloxycarbonyl groups may be formed by reacting the carboxyl group with a silanol in some cases it may be more convenient to react the carboxy group with a derivative of a silanol, e.g. the corresponding chloride or amine. Thus silyloxycarbonyl derivatives are formed with tetravalent silicon moieties, and the silylating agent conveniently is a halosilane or a silazane of the formula $R^4_3SiX$; $R^4_2SiX_2$; $R^4_3Si \cdot NR^4_2$; $R^4_3Si \cdot NH \cdot SiR^4_3$;

$R^4_3Si \cdot NH \cdot COR^4$; $R^4_3Si \cdot NH \cdot CO \cdot NH \cdot SiR^4_3$;

$R^4NH \cdot CO \cdot NR^4 \cdot SiR^4_3$; or $R^4C(OSiR^4_3)$ : $NSiR^4_3$ where X is a halogen and the various groups $R^4$, which can be the same or different, represents hydrogen atoms or alkyl, e.g. methyl, ethyl, n-propyl, iso-propyl; aryl, e.g. phenyl; or aralkyl, e.g. benzyl groups. Some of these compounds may not be particularly stable under the reaction conditions where $R^4$ is H for all $R^4$ groups. It is generally preferred that the $R^4$ groups should be hydrocarbon groups and preferably the hydrocarbon group should be methyl or phenyl as, for example, in hexamethyldisilazane, $(Me_3Si)_2NH$. Examples of suitable silylating agents are trimethyl chlorosilane, hexamethyldisilazane, triethyl chlorosilane, methyl trichlorosilane, dimethyl dichlorosilane, triethyl bromosilane, tri-n-propyl chlorosilane, bromomethyl dimethyl chlorosilane, tri-n-butyl chlorosilane, methyl diethyl chlorosilane, dimethyl ethyl chlorosilane, phenyl dimethyl bromosilane, benzyl methyl ethyl chlorosilane, phenyl ethyl methyl chlorosilane, triphenyl chlorosilane, tri-o-tolyl chlorosilane, tri-p-dimethylaminophenyl chlorosilane, N-ethyl triethylsilylamine, hexaethyldisilazane, triphenyl silylamine, tri-n-propyl silylamine, tetraethyl dimethyl disilazane, tetramethyl diethyl disilazane, tetramethyl diphenyl disilazane, hexaphenyldisilazane, hexa-p-tolyl disilazane, N,O-bis-trimethylsilylacetamide, N-trimethylsilylacetamide, N-(triphenylsilyl)ethylcarbamate and N-(triethylsilyl)urea.

When preparing compounds of the Formula I having silyloxycarbonyl groups using silyl chlorides such as, for example, $Me_3SiCl$ or $Me_2SiCl_2$ it is advantageous to employ a nitrogen base such as, for example, diethylamine, triethylamine, dimethylaniline, quinoline, lutidine or pyridine. If the presence of a nitrogen base is deleterious to the acylation reactants it is advantageous to employ a basic silylating reagent, e.g. hexamethyldisilazane, which loses ammonia on reaction.

An advantage accruing from the use of compounds of the Formula I wherein a silyl ester is used in the process according to the invention is that the esterifying group is removed under mild conditions and hence tends to be removed during one of the isolation or subsequent reaction stages.

The silyloxycarbonyl group is easily converted to a carboxy group by exposing the derivative to an excess of a compound(s) containing active hydrogen, e.g. water, acidified or basified water, alcohols and phenols.

ACYL HALIDE

The acyl halide may be chosen so as to introduce any desired acyl group at the 6- or 7-amino position. One may thus introduce specific acyl radicals as defined in the following general formulae, but it should, however, be noted that this is not intended to be an exhaustive list of all the possible N-acyl groups which may be present.

(i) $R^u C_n H_{2n} CO$— where $R^u$ is aryl (carbocyclic or heterocyclic), cycloalkyl, substituted aryl, substituted cycloalkyl, or a non-aromatic or mesoionic heterocyclic group, and $n$ is an integer from 1–4. Examples of this group include phenylacetyl; substituted phenylacetyl, e.g. fluorophenylacetyl, nitrophenylacetyl, aminophenylacetyl, acetoxyphenylacetyl, methoxyphenylacetyl, methylphenylacetyl, or hydroxyphenylacetyl; N,N-bis (2-chloroethyl) aminophenylpropionyl; thien-2- and -3-acetyl; 4-isoxazolyl and substituted 4-isoxazolylacetyl; pyridylacetyl; tetrazolylacetyl or a sydnoneacetyl group. The substituted 4-isoxazolyl group may be a 3-aryl-5-methyl isoxazol-4-yl group, the aryl group being, e.g. phenyl or halophenyl, e.g. chloro- or bromo- phenyl. An acyl group of this type is 3-o-chlorophenyl-5-methyl isoxazol-4-yl-acetyl.

(ii) $C_n H_{2n+1} CO$— where $n$ is an integer from 1–7. The alkyl group may be straight or branched, and if desired, may be interrupted by an oxygen or sulphur atom or substituted by, e.g. a cyano group. Examples of such groups include cyanoacetyl, hexanoyl, heptanoyl, octanoyl and butylthioacetyl.

(iii) $C_n H_{2n-1} CO$— where $n$ is an integer from 2–7. The alkenyl group may be straight or branched and, if desired, may be interrupted by an oxygen or a sulphur atom. An example of such a group is allylthioacetyl.

(iv)

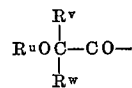

where $R^u$ has the meaning defined under (i) and in addition may be benzyl, and $R^v$ and $R^w$ which may be the same or different each represent hydrogen, phenyl, benzyl, phenethyl or lower alkyl. Examples of such groups include phenoxyacetyl, 2 - phenoxy - 2 - phenylacetyl, 2-phenoxypropionyl, 2-phenoxybutyryl, benzyloxycarbonyl, 2 - methyl - 2 - phenoxypropionyl, p-cresoxyacetyl and p-methylthiophenoxyacetyl.

(v)

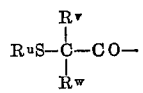

where $R^u$ has the meaning defined under (i) and, in addition, may be benzyl and $R^v$ and $R^w$ have the meanings defined under (iv). Examples of such groups include S-phenylthioacetyl, S - chlorophenylthioacetyl, S - fluorophenylthioacetyl, pyridylthioacetyl, and S - benzylthioacetyl.

(vi) $R^u Z(CH_2)_m CO$— where $R^u$ has the meaning defined under (i) and, in addition, may be benzyl, Z is an oxygen or sulphur atom and $m$ is an integer from 2–5. An example of such a group is S-benzylthiopropionyl.

(vii) $R^u CO$— where $R^u$ has the meaning defined under (i). Examples of such groups include benzoyl, substituted benzoyl (e.g. aminobenzoyl), 4-isoxazolyl- and substituted 4-isoxazolyl carbonyl, cyclopentanecarbonyl, sydone carbonyl, naphthoyl and substituted naphthoyl (e.g. 2-ethoxynapthoyl) quinoxalinylcarbonyl and substituted quinoxalinylcarbonyl (e.g. 3-carboxy-2-quinoxalinylcarbonyl). Other possible substituents for benzoyl include alkyl, alkoxy, phenyl or phenyl substituted with carboxy, alkylamido, cycloalkylamido, allylamido, phenyl(lower) alkylamido, morpholinocarbonyl, pyrrolidinocarbonyl, piperidinocarbonyl, tetrahydropyridino, furfurylamido or N-alkyl-N-anilino, or derivatives thereof, and such substituents may be in the 2- or 2- and 6-positions. Examples of such substituted benzoyl groups are 2,6-dimethoxybenzoyl, 2-biphenylcarbonyl, 2-methylamidobenzoyl and 2-carboxybenzoyl. Where the group $R^u$ represents a substituted 4-isoxazolyl group, the substituents may be as set out above under (i). Examples of such 4-isoxazolyl groups are 3-phenyl-5-methylisoxazol-4-yl carbonyl, 3-o-chlorophenyl-5-methyl isoxazol-4-yl carbonyl and 3-(2,6-dichlorophenyl)-5-methylisoxazol-4-yl carbonyl.

(viii)

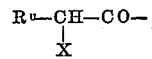

where $R^u$ has the meaning defined under (i) and X is amino, substituted amino (e.g. acylamido or a group obtained by reacting the amino group and/or group(s) of the 6- or 7-side chain with an aldehyde or ketone, e.g. acetone, methylethylketone or ethyl acetoacetate), hydroxy, carboxy, esterified carboxy, triazolyl, tetrazolyl, cyano, halogeno, acyloxy, (e.g. formyloxy or lower alkanoyloxy) or etherified hydroxy group. Examples of such acyl groups are α-aminophenylacetyl, α-carboxyphenylacetyl and 2,2-dimethyl-5-oxo-4-phenyl-1-imidazolidinyl, (ix)

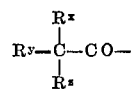

where $R^x$, $R^y$ and $R^z$ which may be the same or different may each represent lower alkyl, phenyl or substituted phenyl. An example of such an acyl group is triphenylcarbonyl.

(x)

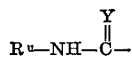

where $R^u$ has the meaning defined under (i) and in addition may be hydrogen, lower alkyl or halogen substituted lower alkyl, and Y represents oxygen or sulphur. An example of such a group is $Cl(CH_2)_2 NHCO$.

(xi)

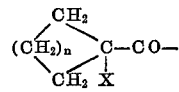

where X has the meaning defined under (viii) above and $n$ is an integer of from 1 to 4. An example of such an acyl group is 1-amino-cyclohexanecarbonyl.

(xii) Amino acyl, for example $R^w CH(NH_2) \cdot (CH_2)_n CO$ where $n$ is an integer from 1–10, or $NH_2 \cdot C_n H_{2n} Ar(CH_2)_m CO$, where $m$ is zero or an integer from 1–10, and $n$ is 0, 1 or 2, $R^w$ is a hydrogen atom or an alkyl, aralkyl or carboxy group or a group as defined under $R^u$ above, and Ar is an arylene group, e.g. p-phenylene or 1,4-naphthylene. Examples of such groups are disclosed in British patent specification No. 1,054,806. A group of this type is the p-aminophenylacetyl group. Other acyl groups of this type include those, e.g. δ-aminoadipoyl derived from naturally occurring amino acids and derivatives thereof, e.g. N-benzoyl-δ aminoadipoyl.

(xiii) Substituted glyoxylyl groups of the formula $R^y \cdot CO \cdot CO$— where $R^y$ is an aliphatic, araliphatic or aromatic group, e.g. a thienyl group, a phenyl group, or a mono-, di- or tri-substituted phenyl group, the substituents being, for example, one or more halogen atoms (F, Cl, Br, or I), methoxy groups, methyl groups, or amino groups, or a fused benzene ring.

PROTECTION OF AMINO GROUPS

When the acyl group being introduced contains an amino group it may be necessary to protect this during the various reaction stages. The protecting group is conveniently one which can be removed by hydrolysis without affecting the rest of the molecule, especially the lactam and 6- or 7-amido linkages. The amine protecting group and the esterifying group at the 3- or 4-COH position can be removed using the same reagent. An advantageous procedure is to remove both groups at the last stage in the sequence. Protected amine groups include urethane, arylmethyl (e.g. trityl) amino, arylmethyleneamino, sulphenylamino or enamine types. Such groups can in general be removed by one or more reagents selected from dilute mineral acids, e.g. dilute hydrochloric acid, concentrated organic acids, e.g. concentrated acetic acid, trifluoroacetic acid, and liquid hydrogen bromide at very low temperatures, e.g. —80° C. A convenient protecting group is the t-butoxycarbonyl group, which is readily removed by hydrolysis with dilute mineral acid, e.g. dilute hydrochloric acid, or preferably with a strong organic acid (e.g. formic acid or trifluoroacetic acid) e.g. at a temperature of 0–40° C., preferably at room temperature (15–25° C.). Another convenient protecting group is the 2,2,2-trichloroethoxycarbonyl group which may be split off by an agent such as zinc/acetic acid, zinc/formic acid, zinc/lower alcohols or zinc/pyridine.

The $NH_2$ group may also be protected as $NH_3^+$ by using the amino acid halide as an acid addition salt under conditions in which the amino group remains protonated.

The acid used to form the acid addition salt is preferably one having a $pK_a$ (in water at 25° C.) of $\not> x+1$, where $x$ is the $pK_a$ value (in water at 25° C.) of the carboxy groups of the amino acid; the acid is preferably monohydric. In practice the acid HQ (see below) will generally have a $pK_a < 3$, preferably $< 1$.

Particularly advantageous results have been found to accrue from the process according to the invention when the acyl halide is a salt of an amino acid halide. Amino acid halides have the formula

$$H_2N—R_1—COHal$$

wherein $R_1$ is a divalent organic group and Hal is chloride or bromide. Salts of such amino acid halides have the formula

$$[H_3N—R_1—COHal]^+Q^-$$

wherein $R_1$ and Hal have the above defined meanings and $Q^-$ is the anion of the acid, HQ having a $pK_a$ as defined above. The acid HQ is preferably a strong mineral acid such as, for example, a hydrohalic acid such as hydrochloric acid or hydrobromic acid. An important amino acid halide, by reason of the valuable cephem and penicillanic acid antibiotics which contain the group derived therefrom is D-N-(α-chlorocarbonyl-α-phenyl)methylammonium chloride, D-$[PhCH(NH_3)COCl]^+Cl^-$, which is referred to herein as D-α-phenylglycylchloride hydrochloride for convenience.

Cephalosporin or penicillin compounds obtained by the process according to the invention and having the acylamido group $R^uCH(NH_2)CONH$— where $R^u$ has the above-defined meaning, may be reacted with a ketone $R^2 \cdot R^3CO$ where $R^2$ and $R^3$ are lower alkyl groups ($C_1$–$C_4$), to yield compounds believed to contain the group:

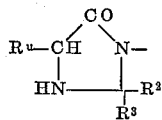

Compounds of this type include hetacillin.

REACTION CONDITIONS

The reaction may conveniently be effected by forming a solution or suspension of the chosen cephalosporin or penicillin nucleus in the oxirane itself, in the oxirane and a diluent or simply in a diluent at a temperature of from —30° to +100° C. In the last case the oxirane may be added, e.g. in solution in say, 1,2-dichloroethane, to the system followed by the acid halide. Variations on this procedure may however be used. The reaction is then allowed to go to completion, if necessary by raising the temperature to accelerate the reaction.

The optimum temperature will depend on the particular reagents used: in the case of acylation of an ester of 7β-amino-3-methylceph-3-em-4-carboxylic acid or of 6β-aminopenicillanic acid with D-phenylglycyl chloride hydrochloride a suitable temperature range is from 0° C. to 50° C., advantageously from 32° to 42° C.

In the aforesaid case of acylation of an ester of 7β-amino-3-methylceph-3-em-4-carboxylic acid or of 6β-aminopenicillanic acid with D-phenylglycyl chloride hydrochloride the ester employed is conveniently a silyl ester and preferably a silyl ester derived from hexamethyldisilazane. The acylation is advantageously effected in an oxirane or in a mixture of an oxirane and acetonitrile as the reaction medium. The oxirane is preferably ethylene oxide or propylene oxide.

By acylating a silyl ester of 7β-amino-3-methylceph-3-em-4-carboxylic acid or of 6β-aminopenicillanic acid with D-phenylglycyl chloride hydrochloride in a reaction medium which is essentially a lower alkylene oxide (if desired in admixture with acetonitrile) it is possible to obtain cephalexin or ampicillin respectively in good yield directly from the reaction medium.

The course of the reaction may be followed by any of the usual techniques such as by chromatographic analysis, by electrophoresis or by polarimetry. In the case of D-phenylglycyl chloride hydrochloride, the course of the reaction may be followed conveniently by observing the dissolution of this reagent which is only sparingly soluble in most of the applicable solvents.

The end product may be recovered from the reaction mixture by any convenient method, depending on the nature of the product. In the case of an ester this may be effected by washing with a base, such as sodium bicarbonate, evaporating to dryness under reduced pressure and crystallisation.

In order that the invention may be well understood the following examples are given by way of illustration only.

In the examples electrophoresis was carried out at pH 2.2 for 1 hour on Whatman 3 MM paper with a potential gradient of 25 volts/cm. The mobilities are relative to that of Dextran blue. The papers were examined under ultraviolet light before spraying with ninhydrin, which revealed the compounds as red or purple spots.

Proton magnetic resonance measurements were made either at 60 or 100 mHz. and the signs of the J values are not given.

EXAMPLE 1

Acylation of p-methoxybenzyl 7β-amino-3-methylceph-3-em-4-carboxylate using propylene oxide as base p - Methoxybenzyl 7β-amino-3-methylceph-3-em-4-carboxylate (1.00 g., 0.003 mole), D-α-phenylglycylchloride hydrochloride (0.74 g., 0.0036 mole) and propylene oxide (1 ml., 0.0144 mole) in methylene chloride (10 ml.) were stirred at room temperature for 30 minutes. Electrophoretic examination of the mixture after this time indicated the presence of p-methoxybenzyl 7β-(D-2-amino - 2 - phenylacetamido)-3-methylceph-3-em-4-carboxylate (mobility 6.9 cm.) and α-phenylgylcine (produced by hydrolysis; mobility 4.5 cm.); no p-methoxybenzyl 7β - amino - 3 - methylceph-3-em-4-carboxylate (mobility 8.2 cm.) was detected.

EXAMPLE 2

Acylation of t-butyl 7β-amino-3-methylceph-3-em-4-carboxylate using ethylene oxide as base (a) A mixture of 7β-amino-3-methylceph-3-em-4-carboxylic acid (16.09 g., 75.2 mmoles), dioxan (100 ml.), sulphuric acid (10 ml.) and isobutylene (90 ml.) was shaken in a pressure bottle until a clear solution resulted (2½ hours). The solution was cooled and poured into a mixture of aqueous sodium bicarbonate (600 ml.), ice (100 g.), and ethyl acetate (150 ml.). The aqueous layer was twice more extracted with ethyl acetate and the extracts were washed with brine and dried. Evaporation left a gum which was triturated with petrol (B.P. 40–60°) to give off-white crystals (11.17 g., 55%). A sample was recrystallised from ether to give the pure ester M.P. 126° $[\alpha]_D$(EtOH)+107°$\lambda_{max}$.

(EtOH) nm., $E_{1cm}^{1\%}$ 239

(Found: C, 53.1; H, 6.5; N, 10.1; S, 11.5. $C_{12}H_{18}N_2O_3S$ requires C, 53.3; H, 6.7; N, 10.35; S, 11.85%.)

(b) Ethylene oxide ((1 ml. 0.020 mole) in 1,2-dichloroethane (6 ml.) at 0° was added over 10 min. to a stirred mixture of t-butyl 7β-amino-3-methylceph-3-em-4-carboxylate (2.7 g., 0.010 mole) and D-α-phenylglycylchloride hydrochloride (2.2 g., 0.011 mole) in 1,2-dichloroethane (6 ml.) at room temperature. After a further 2.5 hr. solution was obtained, and 30 min. later the solution was evaporated. The resulting golden foam was stirred with ether (10 ml.) and potassium carbonate (1.6 g.) in water (10 ml.). After 30 min. the resulting solid was filtered off, washed first with water then with ether, and dried in vacuo giving t-butyl 7β-(D-2-amino-2-phenylacetamido)-3-methylceph-3-em-4-carboxylate as an off-white powder (2.7 g., 51%), M.P. 150–156°, $[\alpha]_D^{20}$+51° (c. 1.00, dioxan), electrophoretic mobility 7.2 cm., $\lambda_{max}$. ((ethanol) 264 mm. ε 6,370), $\nu_{max}$. (CHBr$_3$) 3330, 3280 (NH$_2$), 1770 (β-lactam), 1702 (CO$_2$t-Bu), 1673, 1505 cm.$^{-1}$ (CONH), τ(CDCl$_3$) 2.06 (1-proton double, J. 9 Hz.; CONH), 2.67 5-proton singlet; phenyl protons), 4.29 (1-proton double doublet, J. 5, 9 Hz.; C–7 H), 5.05 (1-proton doublet, J 5 Hz.; C–6 H), 5.43 (1-proton singlet; PhCH), 6.45, 6.90 [two 1-proton doublets (branches of a quartet), J 18 Hz.; C–2 H$_2$], 7.91 (3-proton singlet; C–3 CH$_3$), 8.12 (2-proton broad singlet; NH$_2$), 8.46 (9-proton singlet; t-Bu) [Found: C, 59.2; H, 6.1; N, 10.3; S, 7.8. $C_{20}H_{25}N_3O_4S$ (403.4) requires C, 59.5; H, 6.3; N, 10.4; S, 7.9%.]

(c) A solution of t-butyl 7β-(D-2-amino-2-phenylacetamido)-3-methylceph-3-em-4-carboxylate (1.84 g., 0.0046 mole) in 98%-formic acid (11.5 ml.) was kept at 55° for 2 hr. The formic acid was evaporated, leaving a gum which was stirred with water (8 ml.). After a few minutes the initially produced thin yellow suspension (pH 4—pH paper) thickened as a colourless solid precipitated. The mixture was diluted with acetone (20 ml.), stirred for 30 min., then filtered. The solid on the filter was washed with acetone and ether, then dried, giving 7β-(D-2-amino-2-phenylacetamido)-3-methylceph-3-em-4-carboxylic acid (cephalexin) as a colourless powder (1.01 g., 64%), $[\alpha]_D^{20}$+147° (c. 1.00, water), $\lambda_{max}$. (water) 263 nm. (ε 8,150).

EXAMPLE 3

Acylation of 2,2,2-trichloroethyl 7β-amino-3-methyl ceph-3-em-4-carboxylate using ethylene oxide as base Ethylene oxide (3 ml., 0.061 mole) in 1,2-dichloroethane ((9 ml.) at −78° was added over 30 min. to a stirred mixture of 2,2,2-trichloroethyl 7β-amino-3-methylceph-3-em-4-carboxylate (8.7 g., 0.025 mole) and D-α-phenylglycylchloride hydrochloride (5.6 g., 0.027 mole) in 1,2-dichloroethane (35 ml.) at room temperature. After a further 2 hr., solution was obtained and it was evaporated to give a yellow foam. This was dissolved in 90% formic acid (25 ml.) and added to a stirred mixture of zinc dust (6 g., 0.092 mole) and 90% formic acid (6 ml.) at 0°. The addition was completed with the aid of a further quantity of 90% formic acid (5 ml.). After reaction and removal of zinc the solution was evaporated to dryness to remove formic acid. The residue in water (12 ml.) and acetic acid (10 ml.) was extracted with ether (70 ml.) containing water (5 ml.). The aqueous layer was collected and combined with further water extracts (1 x 3 ml., 1 x 2 ml.) of the etheral layer. The pH of the combined aqueous solutions was adjusted to 3.7 with triethylamine (ca. 2 ml.), the mixture diluted with acetone (120 ml.), and refrigerated for 2 hr.

The solid was filtered off, washed well with acetone, and dried in vacuo at 40° for 16 hr., giving 7β-(D-2-amino-2-phenylacetamido)-3-methylceph - 3 - em-4-carboxylic acid as a colourless powder (6.56 g., 76%), $[\alpha]_D^{22}$+148° (c. 1.00, water), $\lambda_{max}$. (water) 263 nm. (ε 7,770), $\nu_{max}$. (Nujol) 1780, 1750 (β-lactam), 1682, 1530 (CONH), 1590 cm.$^{-1}$ (CO$_2^-$), τ (CF$_3$CO$_2$H) 2.20 (4-proton singlet; NH$_3^+$, CONH), 2.44 (5-proton singlet; phenyl protons), 4.27 (1-proton double doublet, J 4.5, 8 Hz.; C–7 H), 4.52 (1-proton quartet, J 5 Hz.; PhCH), 4.83 (1-proton doublet, J 4.5 Hz., C–6 H), 6.50, 6.77 [two 1-proton doublets (branched of a quartet), J 18 Hz.; C–2 CH$_2$], 7.66 (3-proton singlet; C–3 CH$_3$). Electrophoresis revealed the presence of ca. 1% D-α-phenylglycine (mobility 4.5 cm.) in the cephalexin (mobility 6.3 cm.). Karl-Fischer analysis revealed the presence of 1.2% water in the 7β-(D-2-amino-2-phenylacetamido)-3-methylceph-3-em-4-carboxylic acid, and the Zn content was 3 p.p.m.

EXAMPLE 4

Acylation of 2,2,2-trichloroethyl 7β-amino-3-methylceph-3-em-4-carboxylate using propylene oxide as base p - Methoxybenzyl 7β-amino-3-methylceph-3-em-4-carethane (7 ml.) at room temperature was added over 1 hr. to a stirred mixture of 2,2,2-trichloroethyl 7β-amino-3-methylceph-3-em-4-carboxylate (8.7 g., 0.025 mole) and D-α-phenylglycylchloride hydrochloride (5.6 g., 0.027 mole) in 1,2-dichloroethane (35 ml.) at room temperature. After a further 5 hr. solution was obtained and it was evaporated to give a yellow foam. This was treated with zinc in formic acid exactly as described in Example 6, to give 7β-(D-2-amino-2-phenylacetamido)-3-methylceph-3-em-4-carboxylic acid as a colourless powder (6.46 g., 74%), $[\alpha]_D^{22}$+145° (c. 1.00, water), $\lambda_{max}$. (water) 263 nm. (ε 7,760), D-α-phenylglycine content ca. 1%, moisture content 1.2%, zinc content 7 p.p.m.

EXAMPLE 5

Acylation of p-methoxybenzyl 7β-amino-3-methylceph-3-em-4-carboxylate using ethylene oxide as base p - Methoxybenzyl 7β-amino-3-methylceph-3-em-4-carboxylate, hydrogen p-toluene sulphonate (20.0 g., 0.0395 mole) in ethyl acetate (250 ml.) was treated with sodium hydrogen carbonate (3.4 g., 0.405 mole) in water (150 ml.). When solution was obtained the ethyl acetate layer was collected and combined with further ethyl acetate extracts (2 x 100 ml.) of the aqueous layer, the combined solution dried (magnesium sulphate), and evaporated leaving a foam. This foam was dissolved in methylene chloride (200 ml.), and D-α-phenylglycylchloride hydrochloride (8.9 g., 0.0435 mole) was added. After stirring for 30 min. at room temperature, a solution of ethylene oxide (10 ml., 0.205 mole) in methylene chloride (10 ml.) at 0° was added over 15 min. to the suspension. After stirring for a further 3 hr., the thin suspension was evaporated to give a foam. This was dissolved in 98%-formic acid (250 ml.). After 18 hr. the formic acid was evaporated, leaving a residue which was stirred with ether (250 ml.). The ether-insoluble material was dissolved in water (150 ml.) and the pH adjusted to 3.9 with triethylamine. The mixture was refrigerated for 2 hr., then filtered, giving 7β-(D-2-amino-2-phenylacetamido) - 3-methylceph-3-em-4-carboxylic acid as a colourless powder (10.55 g., 78%), $[\alpha]_D^{20}+153°$ (c. 1.00, water), $\lambda_{max.}$ (water) 263 nm. ($\epsilon$ 7,946).

EXAMPLE 6

Acylation of a silyl derivative of 7β-amino-3-methylceph-3-em-4-carboxylic acid using ethylene oxide as base Dimethyldichlorosilane (5.64 ml., 0.0468 mole) was added to a stirred suspension of 7β-amino-3-methylceph-3-em-4-carboxylic acid (5.0 g., 0.0234 mole) and triethylamine (6.5 ml., 0.0468 mole) in methylene chloride (100 ml.) at 0°. After 5 min. the cooling bath was removed, and the mixture stirred for 1.75 hr., when D-α-phenylglycylchloride hydrochloride (5.26 g., 0.0257 mole) was added. After stirring for a further 1 hr., ethylene oxide (5 ml., 0.102 mole) in methylene chloride (15 ml.) at 0° was added over 30 min., and the reaction allowed to continue for 24 hr. The mixture was diluted with water (20 ml.), stirred for 10 min., and the pH was adjusted to pH 3.7 by the addition of triethylamine. The mixture was diluted with acetone (200 ml.), refrigerated for 2 hr., and then filtered, giving 7β-(D-2-amino-2-phenylacetamido)-3-methylceph-3-em-4-carboxylic acid as a colourless powder (3.79 g., 47%), $[\alpha]_D^{20}+150°$ (c. 1.00, water), $\lambda_{max.}$ (water) 263 nm. ($\epsilon$ 7,500).

EXAMPLE 7

Acylation of silyl derivative of 7β-amino-3-methylceph-3-em-4-carboxylic acid using propylene oxide as base Dimethyldichlorosilane (5.64 ml. 0.0468 mole) was added to a stirred suspension of 7β-amino-3-methylceph-3-em-4-carboxylic acid (5.0 g., 0.0234 mole) and triethylamine (6.5 ml., 0.0468 mole) in methylene chloride (100 ml.) at 0°. After 5 min. the cooling bath was removed, and the mixture stirred for 1.75 hr., when D-α-phenylglycylchloride hydrochloride (5.05 g., 0.0246 mole) was added. After stirring for 1 hr., propylene oxide (5 ml., 0.072 mole) in methylene chloride (15 ml.) at room temperature was added over 5 min., and the reaction allowed to continue for 3 hr. The mixture was evaporated giving a yellow solid which was dissolved in water (15 ml.). The solution was washed with ether (100 ml.), the ether back-washed with water (3 ml.), and the pH of the combined aqueous solutions taken to 3.7 with triethylamine. The mixture was diluted with acetone (200 ml.), refrigerated for 2 hr., and then filtered, giving 7β-(D-2-amino - 2 - phenylacetamido)-3-methylceph-3-em-4-carboxylic acid as a colourless powder (4.68 g., 58%), $[\alpha]_D^{20}+148°$ (c. 1.00, water), $\lambda_{max.}$ (water) 263 nm. ($\epsilon$ 7,700), D-α-phenylglycine content ca. 2%.

EXAMPLE 8

Acylation of 2,2,2-trichloroethyl 7β-amino-3-methylceph-3-em-4-carboxylate using ethylene oxide as base 2,2,2 - trichloroethyl 7β - amino-3-methylceph-3-em-4-carboxylate hydrogen p-toluenesulphonate (51.8 g., 0.10 mole) was stirred with methylene chloride (175 ml.) and sodium hydrogen carbonate (10.5 g.) in water (125 ml.) until solution was complete. The organic layer was separated, washed with water (125 ml.) and evaporated to 50 ml. to obtain a dry solution.

This solution was added to a suspension of D-2-phenylglycyl chloride hydrochloride (22.4 g. 0.109 mole) in ethylene oxide (10 ml., 0.20 mole) and dry methylene chloride (100 ml.) during six minutes at ca. 30°. The mixture was stirred at 33° until solution was complete (65 minutes). Sodium hydrogen carbonate (10 g.) in water (125 ml.) was added and the mixture stirred. The organic layer was separated, washed with water (125 ml.) and evaporated to 100 ml. under reduced pressure. Isopropyl ether (200 ml.) was added and evaporation continued to remove methylene chloride as the product crystallised. After cooling to 0° for 2 hours the off white solid was collected by filtration, washed with isopropyl ether (50 ml.) and dried at 40° in vacuo to yield 2,2,2-trichloroethyl 7β-(D-2-amino-2-phenylacetamido)-3-methylceph-3-em-4-carboxylate, 46.88 g. 97.9% theory, M.P. 158–160°, $[\alpha]_D+32°$ (c., 1.0 in dioxan), $$\lambda_{max.}^{EtOH}\ 265\ nm., E_{1\ cm.}^{1\%}=120$$

EXAMPLE 9

Acylation of 2,2,2-trichloroethyl 7β-amino-3-methylceph-3-em-4-carboxylate using propylene oxide as base Example 8 was repeated on the same scale but propylene oxide (26 ml. 0.37 mole) was used instead of ethylene oxide. The addition of the ester and continued reaction was effected under gentle reflux (42°) until solution was complete (30 minutes). 2,2,2-trichloroethyl 7β-(D - 2 - amino-2-phenylacetamido)-3-methylceph-3-em-4-carboxylate was obtained from isopropyl ether, 46.07 g. 96.2% theory, $[\alpha]_D+35.5°$ (c., 1.0 in dioxan), $$\lambda_{max.}^{EtOH}\ 265\ nm., E_{1\ cm.}^{1\%}=117$$

EXAMPLE 10

Acylation of 2,2,2-trichloroethyl 7β-amino-3-methylceph-3-em-4-carboxylate using ethylene oxide as base 2,2,2-trichloroethyl 7β-amino-3-methylceph-3-em-4-carboxylate hydrogen p-toluenesulphonate (51.8 g.) was stirred with methyl isobutyl ketone (600 ml.) and sodium hydrogen carbonate (10.5 g.) in water (125 ml.) until solution was complete. The organic layer was evaporated under reduced pressure to 300 ml. to obtain a dry solution.

The concentrate was cooled to −15°, ethylene oxide (10 ml.) was added followed by D-N-(2,2,2-trichloroethoxycarbonyl)-α-aminophenylacetyl chloride (34.5 g.) dissolved in methyl isobutylketone during ten minutes keeping the temperature −10 to −15°. The solution was warmed to room temperature during 30 minutes and washed with water (100 ml.) containing 2 N-hydrochloric acid (25 ml.). The organic layer was washed with water (150 ml.) and evaporated under reduced pressure to 300 ml. Isopropyl ether (600 ml.) was added to the warm solution and the product crystallised at −10° overnight. The product was collected by filtration, washed with isopropyl ether and dried at 40° in vacuo to yield 2,2,2-trichloroethyl 7β - [D-N-(2,2,2-trichloroethoxycarbonyl)-2-amino - 2-phenylacetamido]-3-methylceph-3-em-4-carboxylate solvated with 0.5M of methyl isobutyl ketone, 61.7 g. 87.6% theory, $[\alpha]_D+17°$ (c., 1.0 in CHCl₃), $$\lambda_{max.}^{EtOH}\ 265\ nm., E_{1\ cm.}^{1\%}\ 87.5$$

as an off-white solid. A second crop was obtained by evaporation of the liquors to small bulk and diluted with isopropyl ether, 2.8 g. 4.0% theory, $[\alpha]_D+15.5$ (c., 1.0 in CHCl₃).

$$\lambda_{max.}\ 265\ nm., E_{1\ cm.}^{1\%}\ 86$$

EXAMPLE 11

Acylation of 2,2,2-trichloroethyl 7β-amino-3-methylceph-3-em-4-carboxylate using propylene oxide as base Example 10 was repeated on the same scale but propylene oxide (13 ml.) was used instead of ethylene oxide. 2,2,2 - trichloroethyl 7β-[D-N-(2,2,2-trichloroethoxycarbonyl)-2-amino-2-phenylacetamido]-3-methylceph-3-em-4-carboxylate, solvated with 0.5 M of methyl isobutyl ketone, was obtained, 63.34 g., 90.2% theory, $[\alpha]_D+17.5°$ (c., 1.0 in CHCl₃), $$\lambda_{max.}^{EtOH}\ 265\ nm., E_{1\ cm.}^{1\%}=89$$

together with a second crop, 3.5 g., 4.9% theory, $[\alpha]_D+16°$ (c., 1.0 in CHCl₃), $$\lambda_{max.}^{EtOH}\ 265\ nm., E_{1\ cm.}^{1\%}=84$$

EXAMPLE 12

Acylation of 3-acetoxymethyl-7β-aminoceph-3-em-4-carboxylic acid using ethylene oxide as base 3 - acetoxymethyl-7β-aminoceph-3-em-4-carboxylic acid (5 g.) was added to ethyl acetate (100 ml.) and the suspension stirred at 0°. Ethylene oxide (2.8 ml.) was added, followed by the dropwise addition of 2-thienylacetyl chloride (3.2 ml.) over 5 minutes. The suspension was stirred for 1 hour at 0° and then for three hours at 20°. The cloudy solution was washed with N-hydrochloric acid (50 ml.) and the aqueous layer extracted with ethyl acetate (2 x 40 ml.). The ethyl acetate liquors were bulked and washed with 5% w./v. aqueous ammonium sulphate solution (2 x 50 ml.). The aqueous washes were reextracted with ethyl acetate (20 ml.). The bulked ethyl acetate liquors were dried over sodium sulphate, filtered, and a solution of sodium 2-ethylhexanoate (4.68 g.) in methanol (20 ml.) was added to the dried solution. After 1 hour at room temperature the precipitated solid was collected by filtration, slurry washed with acetone (30 ml.) and dried in vacuo at room temperature to give sodium 3 - acetoxymethyl-7β-(2-thienylacetamido)-ceph-3-em-4-carboxylate (5.16 g. 67.5% of theory) $[\alpha]_D + 132°$ (c., 1.0 in water) $\lambda_{max.}$ at 260 nm., $E^{1\%}_{1\,cm.} = 126$ $\lambda_{max.}$ at 237 n.m., $E^{1\%}_{1\,cm.} = 334$

EXAMPLE 13

Acylation of 3-acetoxymethyl 7β-aminoceph - 3 - em-4-carboxylic acid hydrogen p-toluene sulphonate using ethylene oxide as base 3-acetoxymethyl - 7β - aminoceph-3-em-4-carboxylic acid hydrogen p-toluene sulphonate (9.6 g.) suspended in ethyl acetate (100 ml.) with ethylene oxide (4 ml.) was treated as in Example 12 with 2-thienylacetyl chloride (5.45 ml.) and was worked up in the same way to give sodium 3-acetoxymethyl - 7β - (2-thienylacetamido)-ceph - 3 - em - 4 - carboxylate (4.60 g. 55% of theory) $[\alpha]_D + 132°$ (c., 1.0 in water) $\lambda_{max.}$ at 260 nm., $E^{1\%}_{1\,cm.} = 208$; $\lambda_{max.}$ at 237 nm., $E^{1\%}_{1\,cm.} = 325$

EXAMPLE 14

Preparation of 7β - (D-2-amino - 2 - phenylacetamido)-3-methylthiomethylceph - 3 - em - 4 - carboxylic acid via a silyl ester) using propylene oxide Dimethyldichlorosilane (2.64 ml., 0.0221 mole) was added to a solution of 7β-amino - 3 - methylthiomethylceph-3-em-4-carboxylic acid (2.9 g., 0.01105 mole) and triethylamine (3.12 ml., 0.0221 mole) in methylene chloride (50 ml.) at 0°. After 5 minutes the cooling bath was removed and the reaction allowed to continue for 1.75 hours at room temperature. Propylene oxide (5 ml., 0.072 mole) was added, followed by D-α-phenylglycylchloride hydrochloride (2.3 g., 0.01105 mole), the latter addition taking 5 minutes. After 3 hours the mixture was evaporated, giving a yellow solid which was dissolved in water (15 ml.) with the assistance of concentrated hydrochloric acid (6 drops). The solution was washed with ether (100 ml.), the ethereal layer being backwashed with water (3 ml.). Triethylamine was added dropwise to the combined aqueous layers. At pH 1, some brown material separated out and was discarded. Addition of triethylamine was continued until pH 3.7 was reached. The mixture was diluted with acetone (300 ml.) and ether (30 ml.). After 20 hours at 0°, the white solid was collected by filtration, washed thoroughly with acetone (3×10 ml.), and ether (3×10 ml.), and dried to give 7β-(D-2-amino - 2 - phenylacetamido)-3-methylthiomethylceph-3-em-4-carboxylic acid (1.86 g., 43%), $[\alpha]_D^{20} + 43.2°$ (c., 1.00, water), $\lambda_{max.}$ (pH 6 buffer) 265.4 nm. ($\epsilon$ 8,610), electrophoretic mobility 5.5 cm., $\nu_{max.}$ (Nujol) 3180 (NH), 2650 (NH$_3^+$), 1760 (β-lactam) 1690 and 1530 (CONH), 1600 (COO$^-$), and 692 (phenyl), $\tau$ (CF$_3$COOH) 2.23 (4-proton broad signal; NH$_3^+$, CONH), 2.46 (5-proton singlet; phenyl protons), 4.27 (1-proton double doublet, J 4, 8 Hz.; C–7 H), 4.45 (1-proton quartet, J 4 Hz.; PhCH), 4.78 (1-proton doublet, J 4 Hz.; C–6 H), 6.00, 6.40 [two 1-proton doublets (branches of a quartet), J 14 Hz.; CH$_2$SCH$_3$], 6.43 (2-proton singlet; C–2 CH$_2$), 7.66 (3-proton singlet; SCH$_3$), the presence of 0.3 mole triethylamine was also indicated.

EXAMPLE 15

Preparation of the naphthalene-2-sulphonic acid salt of ampicillin (via a silyl ester) using propylene oxide Trimethylchlorosilane (5.1 ml., 0.04 mole) was added to a stirred suspension of 6-aminopenicillanic acid (4.32 g., 0.02 mole) and triethylamine (5.6 ml., 0.04 mole) in methylene chloride (45 ml.) at 0°. After 5 minutes the cooling bath was removed, and the mixture stirred at room temperature for 1.75 hours, when propylene oxide (5 ml., 0.072 mole) was added. D-α-phenylglycylchloride hydrochloride (4.35 g., 0.021 mole) was added over 5 minutes, and the mixture stirred for 3 hours. The solvents were evaporated, giving a yellow solid which was stirred with water (90 ml.) and methylene chloride (45 ml.) while the aqueous layer was adjusted to pH 2 with 2N-hydrochloric acid. A small amount of yellow solid at the interface was filtered off, and the aqueous layer separated. The organic layer was washed twice with water (2×90 ml.), each time adjusted to pH 2. Naphthalene-2-sulphonic acid (5.2 g., 0.025 mole) in ethyl acetate (15 ml.) was added dropwise to the combined aqueous phases while the pH was maintained at pH 1.8 by addition of 2N-sodium hydroxide solution. After 16 hours at 4°, the crystals which had separated out were collected by filtration, and washed with water and ethyl acetate. After drying, the naphthalene - 2 - sulphonate salt of ampicillin was obtained as a white powder (5.81 g., 52%), $[\alpha]_D^{20} + 160°$ (c., 1.00; pH 7 phosphate buffer), $\nu_{max.}$ (Nujol) 3200 (NH), 2620 (NH$_3^+$) 1782 (β-lactam), 1730 (COOH), 1675, 1500 (CONH), 1200 (SO$_3^-$), $\tau$ (DMSO-d$_6$) 1.8 to 2.7 (12-proton complex; naphthyl and phenyl protons), 4.43 (1-proton singlet, C–6 H), 4.53 (1-proton singlet; pHCH), 4.86 (1-proton singlet C–5 H), 5.79 (1-proton singlet; C–3 H), 8.52, 8.60 [two 3-proton singlets; C–2 (CH$_3$)$_2$].

EXAMPLE 16

Acylation of p-methoxybenzyl 7β-amino-3-methylceph-3-em-4-carboxylate using ethyleneoxide p-Methoxybenzyl 7β - amino 3 - methylceph-3-em-4-carboxylate, hydrogen p-toluene sulphonate (40.04 g., 0.079 mole) in methylene chloride (330 ml.) was treated with sodium hydrogen carbonate (10.00 g., 0.119 mole) in water (330 ml.). After stirring for a few minutes, the organic layer was collected and combined with a further methylene chloride extract (100 ml.) of the aqueous layer. The combined solution was dried (magnesium sulphate), and concentrated to 300 ml. Ethylene oxide (10 ml., 0.205 mole) in methylene chloride (10 ml.) was added, the solution warmed to 30° and stirred while D-α-phenylglycylchloride hydrochloride (17.18 g., 0.083 mole) was added. The mixture was stirred at 30° for 2 hours, then extracted with saturated sodium hydrogen carbonate solution (300 ml.). As soon as the evolution of carbon dioxide ceased, the organic layer was separated and washed with water (300 ml.). This washing was extracted with methylene chloride (100 ml.), and the organic solutions combined. The combined solution was evaporated to a foam, which was powdered under ether (400 ml.). After several hours' immersion in ether, crystalline material was obtained. This was filtered off, giving p-methoxybenzyl 7β-(D - 2 - amino-2-phenylacetamido)-3-methylceph-3-em-4- carboxylate as colourless irregular prisms (34.84 g., 94%), M.P. 87–90°, $[\alpha]_D^{19}+25°$ (c., 1.00, dioxan), electrophoretic mobility 6.9 cm., $\lambda_{max.}$ (ethanol) 269 nm. ($\epsilon$ 7,500) $\nu_{max.}$ (CHBr$_3$) 3384, 3320 (NH$_2$, NH), 1770 ($\beta$-lactam), 1714 (CO$_2$R), 1680, 1516 cm.$^{-1}$ (CONH), $\tau$ (CDCl$_3$) 2.09 (1-proton doublet, J 9 Hz.; CONH), 2.68 (5-proton singlet; phenyl protons), 2.70, 3.16 [two 2-proton doublets (branches of a quartet) J 8 Hz.; p-disubstituted aromatic protons], 4.33 (1-proton double doublet, J 4.5, 9 Hz.; C–7H), 4.85 (2-proton singlet; CO$_2$CH$_2$), 5.12 (1-proton doublet, J 4.5 Hz.; C–6 H), 5.44 (1-proton singlet; PhC$\underline{H}$), 6.24 (3-proton singlet; OMe), 6.56, 6.90 [two 1-proton doublets (branches of a quartet), J 18 Hz.; C–2 H$_2$], 7.92 (3-proton singlet; C–3 CH$_3$), 7.96 (2-proton broad singlet; NH$_2$). [Found: C, 61.7; H, 5.6; N, 8.5; S, 6.4. C$_{24}$H$_{25}$N$_3$O$_5$S (468) requires C, 61.7; H, 5.4; N, 9.0; S, 6.7%.]

EXAMPLE 17

Preparation of hetacillin via a silyl ester using propylene oxide

Trimethylchlorosilane (5.1 ml., 0.04 mole) was added to a stirred suspension of 6$\beta$-aminopenicillanic acid (4.32 g., 0.02 mole) and triethylamine (5.6 ml., 0.04 mole) in methylene chloride (45 ml.) at 0°. After 5 minutes the cooling bath was removed, and the mixture stirred at room temperature for 1 hour, when propylene oxide (5 ml., 0.072 mole) was added. A reflux condenser was fitted to the reaction vessel and D-$\alpha$-phenylglycylchloride hydrochloride (4.35 g., 0.021 mole) was added. After 1.5 hours at 35°, the solvents were evaporated, giving an off-white solid. This was mixed with water (50 ml.) and acetone (200 ml.) and adjusted to pH 7.5 with triethylamine. The solution was kept at 4° for 3 days and extracted with methyl iso-butyl ketone (250 ml.). The organic layer was washed with water (50 ml.), and the combined aqueous solution adjusted to pH 2.5 under methyl iso-butyl ketone (50 ml.) with 6 N-hydrochloric acid. The solution was stirred at 0° for 3 hours. A white solid separated out and was filtered off, washed with cold water and methyl-iso-butyl ketone, and dried to give hetacillin as a while powder (3.8 g., 49%), $[\alpha]_D^{20}+357°$ (c., 1.00, pyridine), electrophoretic mobility 4.2 cm. [with fore-running streak showing conversion to ampicillin (mobility 5.55 cm.) (6$\beta$-aminopenicillanic acid has mobility 5.7 cm.)] $\nu_{max.}$ (KBr) 3420 (H$_2$O), 3240 (NH), 1790 ($\beta$-lactam), 1715 ($\gamma$-lactam), 1700 (COOH), and 1400 and 1350 cm.$^{-1}$ (gem. -dimethyl), $\tau$ (DMSO-d$_6$) 2.3 to 2.8 (5-proton multiplet phenyl protons), 3.5 (broad peak; COO$\underline{H}$; NH, water), 4.49 (1-proton doublet, J. 4 Hz.; C–7$\underline{H}$), 4.83 (1-proton doublet, J 4 Hz.; C–6H), 5.31 (1-proton singlet; PhC$\underline{H}$), 5.65 (1-proton singlet; C–3H), 8.53 [6-proton singlet; side chain (CH$_3$)$_2$], and 8.38 and 8.64 [two 3-proton singlets; C–2 (CH$_3$)$_2$]. This material was similar to a specimen described by Hardcastle et al., (J. Org. Chem., 1966, 31, 897), M.P. 182.8 to 183.9° (decomp.), $[\alpha]_D^{25}+366°$ (c. 1, pyridine).

EXAMPLE 18

Acylation of t-butyl 7$\beta$-amino-3-bromomethylceph-3-em-4-carboxylate, 1$\beta$-oxide, hydrobromide with ethylene oxide as base (a) t-Butyl 7$\beta$-amino-3-bromomethylceph-3-em-4-carboxylate, 1$\beta$-oxide, hydrobromide. — A suspension of t-butyl 3-bromomethyl-7$\beta$-formamidoceph-3-em - 4 - carboxylate, 1$\beta$-oxide [9.15 g., 23.25 mmole prepared as described in Preparation A 4 (a), (b) (i) and (c) and Example B 4 (i) of copending application No. 66,128] in dry methanol (58 ml.) and ether (58 ml.) was stirred and cooled to 0 to 5° and phosphorus tribromide (6.55 ml. 58 mmole) was added over 20 minutes so that the temperature did not rise above 10°. Solid began to separate from the reaction mixture before all the starting material had gone into solution. The mixture was stirred for 30 minutes, and the solid was collected, washed by stirring with ether (150 ml.), refiltered and dried to give the title hydrobromide (9.67 g., 93%), M.P. >200° $[\alpha]_D^{25}-6.7°$ (c. 0.9; Me$_2$SO), $\lambda_{max.}$ (EtOH) 276 nm. ($\epsilon$ 8,875).

(b) Acylation.—A solution of ethylene oxide (45 ml.) in methylene chloride (30 ml.) followed by phenoxyacetyl chloride (3.08 g., 19.4 mmole) was added to a stirred suspension of t-butyl 7$\beta$-amino-3-bromomethylceph-3-em-4-carboxylate, 1$\beta$-oxide, hydrobromide (9.66 g., 21.7 mmole) in dry methylene chloride (70 ml.) cooled to 0° in an ice-bath. The suspension was stirred at 0° for ½ hr. and then at 25° for 1½ hr. when nearly all the solid had gone into solution. The reaction mixture was washed successively with 2N-hydrochloric acid, water, 3% sodium bicarbonate solution, water and saturated sodium bromide solution (50 ml. of each), dried (MgSO$_4$) and evaporated. The residual gel was crystallised from acetone (ca. 150 ml.) to give t-butyl 3-bromomethyl-7$\beta$-phenoxyacetamidoceph-3-em-4-carboxylate, 1$\beta$-oxide as white crystals (7.54 g., 70%), M.P. 130 to 132°, $[\alpha]_D^{25}-25°$ (c. 1.00; Me$_2$SO), $\lambda_{max.}$ (EtOH) 275 nm. ($\epsilon$ 11,150). Found: C, 48.1, 47.8; H, 4.7, 4.6; Br, 15.6; N, 5.0, 5.3; S, 6.4. Calc'd for C$_{20}$H$_{23}$BrN$_2$O$_6$S (499.4) C, 48.1; H, 4.6; Br, 16.0; N, 5.6; S, 6.4%). Evaporation of the filtrate gave a second crop (0.84 g., 8%), M.P. 132 to 133°, $[\alpha]_D^{20}-23°$ (c. 1.00; Me$_2$SO) $\lambda_{max.}$ (EtOH) 275.5 nm. ($\epsilon$ 11,200). The infrared and NMR spectra of this compound were similar to those of material prepared in a different way.

EXAMPLE 19

Acylation of 2,2,2-trichloroethyl 7$\beta$-amino-3-bromomethylceph-3-em-4-carboxylate, 1$\beta$ - oxide, hydrobromide with ethylene oxide as base (a) 2,2,2-trichloroethyl 7$\beta$-amino - 3 - bromomethylceph-3-em-4-carboxylate, 1$\beta$ - oxide, hydrobromide.—A suspension of 2,2,2-trichloroethyl 3-bromomethyl-7$\beta$-formamidoceph-3-em-4-carboxylate, 1$\beta$-oxide [1.17 g., 2.5 mmole prepared as described in Preparation A3 (a) and (b)(i) and Example B3 (i) of our copending application No. 66,128] in dry methanol (10 ml.) and ether (10 ml.) was stirred and cooled in an ice-bath and phosphorus tribromide (1.18 ml. 10 mmole) was added over 20 minutes so that the temperature was kept below 10°. The starting material had gone into solution by the end of the addition; after a further 10 minutes a solid came out of solution. The mixture was stirred for 15 minutes, diluted with ether and refrigerated. The solid was collected and washed well with ether to give the title hydrobromide (1.24 g., 95%), M.P.>200°, $[\alpha]_D^{22}-21.6°$ (c. 0.97; Me$_2$SO), $\lambda_{max.}$ (MeOH) 283 nm. ($\epsilon$ 8,200), $\nu_{max.}$ (Nujol) ca. 2600 (NH$_3^+$), 1790 (azetidin-2-one), 1730 (CO$_2$R) and 993 cm.$^{-1}$ (S→O), (Me$_2$SO-d$_6$) 3.7 to 6.4 (broad signal; NH$_3^+$), 4.54 (1H, d., J 5 Hz.; C$_7$—$\underline{H}$), 4.72, 4.90 (2 H, AB-q, J 12 Hz.; C$\underline{H}_2$CCl$_3$), 4.76 (1 H, d., J 5 Hz.; C$_6$—$\underline{H}$), 5.40 (2 H, s.; C$_3$—C$\underline{H}_2$Br), 5.86 (2 H, s.; C$_2$—$\underline{H}_2$). (Found: C, 22.6, 22.7; H, 2.3, 2.3; N, 5.15, 5.1; S, 6.2; total halogen 4.47 equiv./mole.

$C_{10}H_{11}Br_2Cl_3N_2O_4S$ (521.5) requires C, 23.1; H, 2.1; N, 5.4; S, 6.15%; total halogen 5 equiv./mole).

(b) Acylation.—A solution of ethylene oxide (40 ml.) in dry methylene chloride (30 ml.) followed by thienylacetyl chloride (1.2 ml. 1.05 equiv.) was added to a suspension of 2,2,2-trichloroethyl 7$\beta$-amino-3-bromomethylceph-3-em-4-carboxylate, 1$\beta$-oxide, hydrobromide (4.94 g., 9.5 mmole) in dry methylene chloride (40 ml.). The solid went into solution after 2 minutes. The mixture was stirred for 4 minutes, washed with 2.4% sodium carbonate solution (50 ml.), combined with the methylene chloride back-wash (25 ml.) of the alkaline washings, washed with water and saturated aqueous sodium bromide solution (50 ml. of each), dried and evaporated. The residue was triturated with light petroleum, B.P. 40–60°, to give 2,2,2-trichloroethyl 3-bromomethyl-7β-(2-thienylacetamido)ceph-3-em-4-carboxylate, 1β-oxide (4.94 g., 92%), $[\alpha]_D + 23°$, $\lambda_{max.}$ 232 nm. ($\epsilon$ 11,350) and 283 nm. ($\epsilon$ 9,100).

EXAMPLE 20

Acylation of 2,2,2-trichloroethyl 7β-amino-3-methylthiomethylceph-3-em-4-carboxylate, hydrochloride with ethylene oxide as base To a suspension of 2,2,2-trichloroethyl 7β-amino-3-methylthiomethylceph-3-em-4-carboxylate, hydrochloride [1.60 g., 3.735 mmole prepared as described in Example D 17 (i), (ii)(a) and (iii) of copending application No. 66,128] in methylene chloride (30 ml.) was added a solution of sodium hydrogen carbonate (0.63 g., 7.5 mmole) in water (30 ml.). The mixture was stirred until solution was complete. The layers were separated and the aqueous portion was back-extracted with methylene chloride (15 ml.). The combined organic extracts were washed with water (15 ml.), dried and concentrated to ca. 20 ml. The stirred solution was cooled in an ice-water bath and a solution of ethylene oxide (2 ml.) in methylene chloride (3 ml.) was added followed by a solution of D(—)-(N-2,2,2-trichloroethoxycarbonyl)-2-amino - 2 - phenylacetyl chloride (1.42 g., 4.11 mmole) in methylene chloride (10 ml.+10 ml. washings). The mixture set to a gel immediately which almost completely redissolved during 30 min. stirring at this temperature. The cooling bath was then withdrawn and isobutyl methyl ketone (25 ml.) was added. After 30 min. stirring at ca. 25° the clear-yellow solution was washed with N-hydrochloric acid (50 ml.), which was in turn back-extracted with methylene chloride (2×15 ml.).

The combined methylene chloride extracts were successively washed with water, 3% aqueous sodium hydrogen carbonate and water (50 ml., of each), then dried and evaporated to a yellow foam. Treatment with light petroleum (B.P. 60 to 80°) (30 ml.)-ether (10 ml.) provided 2,2,2-trichloroethyl 3 - methylthiomethyl-7β-[D-2-phenyl-2-(2,2,2 - trichloroethoxycarbonylamino)acetamido]ceph-3-em-4-carboxylate as a pale yellow microcrystalline solid (2.54 g., 97%), $[\alpha]_D - 30.3°$ (CHCl$_3$), $\lambda_{max.}$ 268.5 nm. ($\epsilon$ 7,070) $\nu_{max.}$ (CHBr$_3$) 3436 (NH), 1781 (azetidin-2-one), 1736 (CO$_2$CH$_2$CCl$_3$), 1693 and 1510 cm.$^{-1}$ (CONH), $\tau$ 0.66 (1H, d., J 9 Hz.; C$_7$—NH), 1.52 (1H, d., J 9 Hz.; —OCO·NH), 2.3 to 2.7 (5H, m., C$_6$H$_5$), 4.24 (1H, dd., J 5 and 9 Hz.; C$_7$—H) 4.50 (1H, d., J 9 Hz.; C$_6$H$_5$CH—), 4.79 and 5.02 (2H, AB-q, J 13 Hz.;

C$_4$—CO$_2$CH$_2$CCl$_3$), 4.81 (1H, d., J 5 Hz.; C$_6$—H), 5.16 (2H, s.,

NH·CO·OCH$_2$CCl$_3$), 6.24 and 6.49 (2H, AB-q., J 14 Hz.; CH$_2$SCH$_3$), 6.38 (2H, s.; C$_2$—CH$_2$), 7.99 (3H, s.; SCH$_3$), 8.7 and 9.1 (multiplets; light petroleum), TLC (2½% Me$_2$CO in CH$_2$Cl$_2$) showed a single spot, R$_F$ 0.44.

EXAMPLE 21

Acylation of 2,2,2-trichloroethyl 7β-amino-3-methylthiomethylceph-3-em-4-carboxylate, hydrochloride with ethylene oxide as base (a) 2,2,2-trichloroethyl 7β-amino-3-methylthiomethylceph-3-em - 4 - carboxylate, hydrochloride.—Phosphorus oxychloride (0.5 ml., 5.47 mmole) was added dropwise over 3 min. to a stirred suspension of 2,2,2-trichloroethyl 7β-formamido-3-methylthiomethylceph - 3 - em-4-carboxylate [1.05 g., 2.5 mmole, prepared as described in Example D 17 (i) and (ii)(a) of copending application No. 66,128] in dry methanol (10 ml.). During the addition the starting material went into solution and the temperature of the mixture reached a maximum of ca. 45°. After 1 min. a white solid came out of the solution and the mixture rapidly set solid. The mixture was diluted with ether (10 ml.), stirred briefly and the product collected, washed with ether (ca. 25 ml.) and dried to furnish the title hydrochloride as a feathery white solid (941 mg., 88%), M.P. 169–172° (with decomposition), $[\alpha]_D^{20} + 5.25°$ (c. 0.99; Me$_2$SO), $\lambda_{max.}$ (MeOH) 272.5 nm. ($\epsilon$ 6,640), $\nu_{max.}$ (Nujol) ca. 2600 (—NH$_3^+$), 1775 (azetidin-2-one) and 1720 cm.$^{-1}$ (—CO$_2$CH$_2$CCl$_3$), $\tau$ (Me$_2$SO—d$_6$) 4.69 (1-proton doublet, J 5 Hz.; C$_7$H), 4.88 and 5.01 (2-proton AB-quartet, J 12 Hz.; —CH$_2$CCl$_3$), 4.90 (1-proton doublet, J 5 Hz.; C$_6$—H), 6.14 and 6.39 (2-proton AB-quartet, J 17 Hz.; C$_2$—CH$_2$), 6.23 (2-proton singlet; —CH$_2$SCH$_3$) and 7.97 (3-proton singlet; —SCH$_3$) (Found: C, 31.2; H, 3.3; Cl, 33.0; N, 6.6; S, 15.0. C$_{11}$H$_{14}$Cl$_4$N$_2$O$_3$S$_2$ (428.2) requires C, 30.85; H, 3.3; Cl, 33.1; N, 6.55; S, 15.0%). Electrophoresis showed a single spot, R$_C$ 2.8, which migrated towards the cathode and which gave a yellow colour (on a pink background) upon spraying with potassium iodoplatinate reagent.

(b) 2,2,2 - trichloroethyl 7β-(D-2-amino-2-phenylacetamido)-3-methylthiomethylceph - 3 - em-4-carboxylate, hydrochloride.—To a suspension of 2,2,2-trichloroethyl 7β-amino-3-methylthiomethylceph - 3 - em-4-carboxylate hydrochloride, (4.28 g., 10 mmole) in methylene chloride (100 ml.) was added a solution of sodium hydrogen carbonate (1.68 g., 20 mmole) in water (100 ml.). The mixture was stirred until complete solution was obtained and the phases were separated. The aqueous phase was extracted with methylene chloride (50 ml.) and the combined organic portions were washed with water (50 ml.) dried by filtration through magnesium sulphate, and concentrated to ca. 50 ml. This solution was cooled with stirring by immersion in an ice-water bath and D(—)-α-phenylglycylchloride hydrochloride (2.27 g., 11 mmole) was added followed by a solution of ethylene oxide (5 ml.) in dry methylene chloride (15 ml.). The cooling bath was withdrawn and the suspension was stirred at gentle reflux (bath temperature 35 to 40°) until it clarified. (2 hrs.). The solution was washed with 2 N-hydrochloric acid and brine solution (100 ml. of each), dried and evaporated, leaving a yellow waxy solid which was stirred with ether (100 ml.) for ca. 1 hr. The resulting off-white powder was collected and dried to give the title hydrochloride (5.09 g., 90.8%), M.P. 139 to 141°, $[\alpha]_D^{25} + 23.0°$ (c. 1.00; Me$_2$SO), $\lambda_{max.}$ (MeOH) 268 nm. ($\epsilon$ 6,800), $\nu_{max.}$ (Nujol) ca. 2600 (NH$_3^+$), 1760 (azetidin-2-one), 1726 (CO$_2$CH$_2$CCl$_3$), and 1680 and 1530 cm.$^{-1}$ (CONH). Examination of the high-field portion of the P.M.R. spectrum revealed the presence of ca. 5% of the ceph-2-em isomer as judged by the relative intensities of the —SMe singlets (ceph-3-em isomer, $\tau$ 8.00; ceph-2-em isomer, $\tau$ 8.07). Electrophoresis at pH 2.2 showed only one spot migrating towards the cathode, R$_X$ 1.03, which gave a mauve colour upon spraying with an 0.5% (w./v.) solution of ninhydrin in ethanol, followed by warming.

EXAMPLE 22

Acylation of silyl derivative of 7β-amino-3-methyl ceph-3-em-4-carboxylic acid using propylene oxide as base and solvent with added acetonitrile 7β-amino-3-methylceph-3-em-4-carboxylic acid (4.28 g.; 0.02 mole) was boiled under reflux in a mixture of acetonitrile (40 ml.) and hexamethyldisilazane (4.52 ml.; 1.1 mole equivalents) for 45 minutes. Solvent was removed by distillation under reduced pressure and the yellow gum dissolved with stirring in a mixture of acetonitrile (60 ml.) and propylene oxide (40 ml.). D-α-phenylglycylchloride hydrochloride (4.92 g.), was added. The solid dissolved and after 10 minutes continued stirring precipitation occurred. The suspension was filtered and the bed washed with 3:2 mixture of acetonitrile/propylene oxide (20 ml.) then diethyl ether (40 ml.) and dried in vacuo to give crude 7β-(D-2-amino-2-phenylacetamido)-3-methylceph-3-em-4-carboxylic acid (7.65 g.) λ$_{max.}$ (in pH 4.4 buffer) 262 nm., ($E_{1cm.}^{1\%}$=177)

Paper chromatogram (Whatman 3 mm. paper) developed in 7:3 n-propanol/water and visualised with ninhydrin gave 1 major spot R$_F$ 0.39 and 2 minor spots R$_F$ 0.26 and 0.55 τ(CF$_3$COOH) ca. 2.0–2.4 (broad peak —CON$\underline{H}$ and —N$\underline{H}_3^+$), 2.41 (5-proton singlet; C$_6$$\underline{H}_5$), ca. 4.1–4.7. (2 proton unresolved multiplet, C$_7$—$\underline{H}$ and C$_6$H$_5$C$\underline{H}$—), 4.78 (1-proton doublet, J$_4$Hz.; C$_6$—$\underline{H}$), 6.47 and 6.78 (2 proton AB quartet, J 18 Hz.; C$_2$—C$\underline{H}_2$) and 7.68 (3 proton singlet, C$_3$—C$\underline{H}_3$).

EXAMPLE 23

Acylation of silyl derivative of 7β-amino-3-methylceph-3-em-4-carboxylic acid using propylene oxide as base and solvent 7β-amino-3-methylceph-3-em-4-carboxylic acid (4.28 g.; 0.02 mole) was boiled under reflux in a mixture of acetonitrile (40 ml.) and hexamethyldisilazane (4.52 ml.; 1:1 mole equivalents) for 45 minutes. Solvent was removed by distillation under reduced pressure and the yellow gum dissolved in propylene oxide (130 ml.). D-α-phenylglycylchloride hydrochloride (4.92 g.) was added to the stirred solution to give a clear solution followed almost immediately by precipitation. The suspension was filtered and the bed washed with propylene oxide (20 ml.); diethyl ether (40 ml.) and dried in vacuo to give crude 7β-(D-2-amino-2-phenyl acetamido)-3-methylceph-3-em-4-carboxylic acid (8.0 g.), λ$_{max.}$ (in pH 4.4 buffer) 262 nm.

($E_{1cm.}^{1\%}$=165)

Paper chromatogram (Whatman 3 MM paper) developed in 7:3 n-propanol/water and visualised with ninhydrin gave 1 major spot R$_F$ 0.39 and 2 minor spots R$_F$ 0.26 and 0.55 τ(CF$_3$COOH) gave a similar spectra to Example 29 but with additional signals at 7.9 (C$\underline{H}_2$CN) and 9.55 (Si(C$\underline{H}_3$)$_3$).

EXAMPLE 24

Preparation of ampicillin via a silyl ester using propylene oxide

Dimethyldichlorosilane (4.82 ml., 0.04 mole) was added to a stirred suspension of 6β-aminopenicillanic acid (4.32 g., 0.02 mole) and triethylamine (5.6 ml., 0.04 mole) in methylene chloride (45 ml.) at 0°. After 5 minutes the cooling bath was removed, and the mixture stirred at room temperature for 1 hour, when propylene oxide (5 ml., 0.072 mole) was added. A reflux condenser was fitted to the reaction flask and D-α-phenylglycylchloride hydrochloride (4.35 g., 0.021 mole) was added. After 1.5 hours at 35°, the solvents were evaporated, giving an off-white solid. This was taken up in water (15 ml.) and ether (15 ml.), adding 6N-hydrochloric acid (6 drops) to achieve complete solution. More ether (90 ml.) was added and the aqueous layer was separated. The ether was washed with water (3 ml.) and the combined aqueous layer adjusted to pH 4.65 under ether (10 ml.). After 3 hours refrigeration, the white gelatinous precipitate was washed thoroughly with water, acetone, and ether, and dried to give ampicillin (1.48 g., 21.2%), [α]$_D^{20}$+298° (c., 0.25, water), electrophoretic mobility 5.55 cm. (6β-aminopenicillanic acid, 5.7 cm.), ν$_{max.}$ (Nujol) 3400 (H$_2$O), 3160 (NH), 2650 (NH$_3^+$), 1770 (β-lactam), 1672, 1530 (CONH), 1596 (COO$^-$) and 700 cm.$^{-1}$ (phenyl), τ (D$_2$O, with NaHCO$_3$) 2.62 (5-proton singlet; phenyl protons, 4.56 (2-proton singlet; C—6H, C—7H), 4.80 (1-proton singlet; PhC$\underline{H}$), 5.87 (1-proton broad singlet; C—3H), and 8.46 and 8.54 (two 3-proton singlets; C—2 (C$\underline{H}_3$)$_2$].

EXAMPLE 25

Acylation of silyl ester of 6β-aminopenicillanic acid using propylene oxide

6β-aminopenicillanic acid (4.32 g.; 0.02 mole) was boiled under reflux in a mixture of acetonitrile (40 ml.) and hexamethyldisilazane (5 ml.; 1.1 mole equivalent) for 45 minutes. Solvent was removed by distillation under reduced pressure and the residual gum dissolved with stirring in a mixture of acetonitrile (60 ml.) and propylene oxide (40 ml.). D-α-phenylglycylchloride hydrochloride (4.84 g.) was added. The solid dissolved and stirring was continued for 20 minutes during which time precipitation occurred. The suspension was filtered and the bed washed with 3:2 acetonitrile/propylene oxide (30 ml.), diethyl ether (40 ml.) and dried in vacuo to give crude ampicillin (7.37 g.); [α]$_D^{20}$+210° (c., 0.22, H$_2$O) M.P. 198° (d.). Paper chromatogram (Whatman 3 MM paper) developed in 7:3 n-propanol/water and visualised with ninhydrin gave 1 major spot R$_F$ 0.5 with minor spots R$_F$ 0.25, 0.42, 0.64 τ (D$_2$O with NaHCO$_3$) 2.62 (5 proton singlet; phenyl protons, 4.56 (2 proton singlet; C—6H, C—7H), 4.8 (1-proton singlet; PhC$\underline{H}$), 5.87 (1 proton broad singlet; C—3H), 8.46 and 8.54 [two-3-proton singlets; C—2 (CH$_3$)$_2$] with addition signal 7.92 (acetonitrile).

EXAMPLE 26

Acylation of (p-nitrobenzyl)7β-amino-3-methylceph-3-em-4-carboxylate, hydrochloride using ethylene oxide as base A suspension of p-nitrobenzyl 7β-amino-3-methylceph-3-em-4-carboxylate, hydrochloride (7.72 g. 20 mmoles) in methylene chloride (100 ml.) and 4% sodium hydrogen carbonate solution (50 ml.) was stirred for about 30 minutes when some effervescence occurred and a copious solid presumably the free amino compound separated. More methylene chloride (about 200 ml.) and bicarbonate solution (50 ml.) were added and the mixture was shaken until almost all of the solid had slowly dissolved. The aqueous phase was washed with methylene chloride and the combined organic phases were dried (MgSO$_4$) and concentrated to about 250 ml. This solution was stirred and D-α-phenylglycyl chloride hydrochloride (4.58 g. 1.02 equiv.) followed by a solution of ethylene oxide (10 ml.) in methylene chloride (30 ml.) was added. The suspension was warmed to gentle reflux for 1½ hours then allowed to stand at 20° C. overnight. T.L.C. (acetone:methylene chloride 1:3) indicated that acylation was complete. The reaction mixture was washed with aqueous sodium hydrogen carbonate solution and water, dried (MgSO$_4$) to a yellow gum. Addition of ethyl acetate and ether and re-evaporation gave a yellow-brown solid. This solid was crystallised from hot methanol- isopropanol (1:1) when some impure p-nitrobenzyl 7β - (D - 2 - amino-2-phenylacetamido)-3-methylceph-3-em-4-carboxylated (1.34 gm. 14%) remained out of solution: the filtrate deposited the pure product (3.08 gm.) 32% M.P. 134–7° [α]$_D$+101 (CHCl$_3$) λ$_{max.}$ (EtOH) 264 nm. (ε 16400) N.M.R. (CDCl$_3$)τ 1.75 (2H, doublet J 9 Hz. (C$\underline{H}$=CNO$_2$) 1.95 (1H, doublet J 9 Hz. N$\underline{H}$), 2.42 (2H, doublet J 9 Hz. C$\underline{H}$=C—CH$_2$), 2.67 (5H, singlet C$_6$$\underline{H}_5$), 4.32 (1H, double doublet J 9 and 5 Hz. C—7H), 4.77 (2H, singlet C$\underline{H}_2$C$_6$H$_4$NO$_2$), 5.13 (1H, doublet J 5 Hz. (C—6H), 5.53 (1H, singlet C—2H), 6.51 and 6.93 (2H AB-q J 18 Hz. C$_2$2$\underline{H}_2$), 7.93 (3H singlet C—3C$\underline{H}_3$), 8.17 (2H, snglet N$\underline{H}_2$).

We claim:

1. In a process for acylating a 7-aminocephalosporin or 6-aminopenicillin with an acyl chloride or bromide in the presence of an agent to bind hydrogen chloride or bromide liberated in the acylation reaction, the improvement which comprises contacting the 7-aminocephalosporin or 6-aminopenicillin with the acyl chloride or bromide in the presence of a mono- or di-epoxide having a boiling point of 100° C. or less at normal pressure as said agent.

2. A process as defined in claim 1 wherein the epoxide is a mono-epoxide.

3. A process as defined in claim 1, wherein the epoxide is ethylene oxide, propylene oxide, cyclohexene oxide, styrene oxide, epichlorohydrin, phenylglycidyl ether or butadiene diepoxide.

4. A process as defined in claim 1 wherein the epoxide is ethylene oxide.

5. A process as defined in claim 1 wherein the epoxide is propylene oxide.

6. A process as defined in claim 1 carried out in said epoxide as the reaction medium.

7. A process as defined in claim 1 carried out in a reaction medium including an inert diluent selected from the group consisting of dichloromethane, 1,2-dichloroethane, ethyl acetate, acetone, methyl isobutyl ketone, acetonitrile, N,N-dimethylacetamide and N,N-dimethylformamide.

8. A process as defined in claim 8 wherein the diluent is acetonitrile.

9. A process as defined in claim 1 carried out at a temperature of from −30° to +100° C.

10. A process as defined in claim 1 wherein said 7-aminocephalosporin has a carboxyl-protecting ester group containing 1–20 carbon atoms at the 4-position or said 6-aminopenicillin has a carboxyl-protecting ester group containing 1–20 carbon atoms at the 3-position.

11. A process as defined in claim 10 wherein the ester is a 2,2,2-trichloroethyl, a t-butyl, a diphenylmethyl, a p-methoxybenzyl or a p-nitrobenzyl ester.

12. A process as defined in claim 10 wherein the ester is a silyl ester.

13. A process as defined in claim 1 wherein the acyl chloride or bromide is D-N-($\alpha$-chlorocarbonyl-$\alpha$-phenyl) methylammonium chloride.

14. A process for the manufacture of cephalexin or ampicillin which comprises contacting a carboxyl-protecting ester containing from 1–20 carbon atoms in the ester group of 7$\beta$-amino-3-methylceph-3-em-4-carboxylic acid or of 6$\beta$ - aminopenicillanic acid respectively with D-$\alpha$-phenylglycyl chloride hydrochloride in the presence of an mono-epoxide having a boiling point of 100° C. or less at normal pressure at a temperature of 0 to 50° C., said mono-epoxide binding the liberated hydrogen chloride.

15. A process as defined in claim 14 carried out at a temperature of from 32 to 42° C.

16. A process as defined in claim 14 wherein the ester is a silyl ester.

17. A process as defined in claim 14 wherein the silyl ester is one of hexamethyldisilazane.

18. A process as defined in claim 14 carried out in said mono-epoxide as the reaction medium.

19. A process as defined in claim 14 carried out in a reaction medium including acetonitrile as diluent.

20. A process as defined in claim 14 wherein the mono-epoxide is ethylene oxide or propylene oxide.

21. A process as defined in claim 1 wherein the acyl chloride or bromide is a hydrochloride or hydrobromide salt of an amino acid chloride or bromide.

References Cited

UNITED STATES PATENTS 3,351,597  11/1967  Higgins _____ 260—243 C

NICHOLAS S. RIZZO, Primary Examiner

U.S. Cl. X.R.

424—271, 246